(12) United States Patent
Hui et al.

(10) Patent No.: US 8,454,288 B2
(45) Date of Patent: Jun. 4, 2013

(54) ANTI-WEARING NUT AND BOLT

(75) Inventors: David Hui, Taipei (TW); Chien-Liang Lin, Taipei (TW)

(73) Assignee: David Hui, Taipei (TW)

( * ) Notice: Subject to any disclaimer, the term of this patent is extended or adjusted under 35 U.S.C. 154(b) by 398 days.

(21) Appl. No.: 12/930,412

(22) Filed: Jan. 7, 2011

(65) Prior Publication Data
US 2011/0229284 A1 Sep. 22, 2011

(30) Foreign Application Priority Data

Mar. 19, 2010 (TW) .............................. 99204874 U

(51) Int. Cl.
*F16B 23/02* (2006.01)

(52) U.S. Cl.
USPC ............................................ 411/402; D8/387

(58) Field of Classification Search
USPC .................. 411/372.5, 372.6, 396, 406–408, 411/429–431; D8/387
See application file for complete search history.

(56) References Cited

U.S. PATENT DOCUMENTS

| 3,088,361 | A | * | 5/1963 | Hallock | 411/372.5 |
| 4,189,976 | A | * | 2/1980 | Becker | 411/396 |
| D372,857 | S | * | 8/1996 | Hirai | D8/387 |
| D455,330 | S | * | 4/2002 | Gilbert et al. | D8/331 |

* cited by examiner

*Primary Examiner* — Gary Estremsky

(57) ABSTRACT

An anti-wearing nut or bolt including a plurality of polygonal sides circumferentially formed on a head portion of the nut or bolt and; each polygonal side including: two inclined sub-sides respectively inclined outwardly convergently from opposite apexes of each polygonal side, each inclined sub-side extrapolatively defining a small biasing acute angle between each inclined sub-side and a corresponding socket side, and an intermediate sub-side transversely intersecting the two inclined sub-sides; whereby upon a clockwise or counter-clockwise rotation of the socket, one inclined sub-side of the nut or bolt will be planarly engaged with each socket side, without being linearly bitten or dogged, to thereby prevent wearing or damage of the apexes of the nut or bolt.

8 Claims, 4 Drawing Sheets

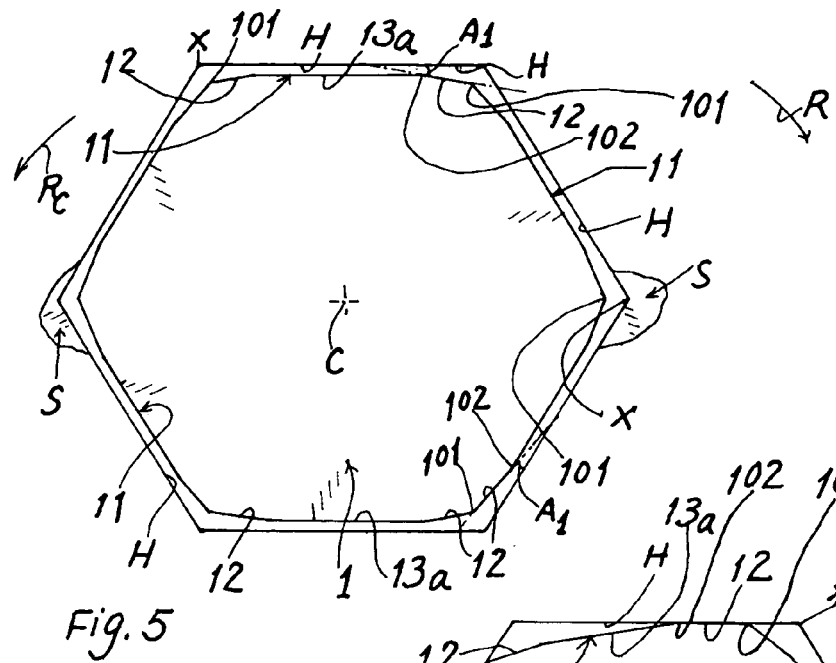
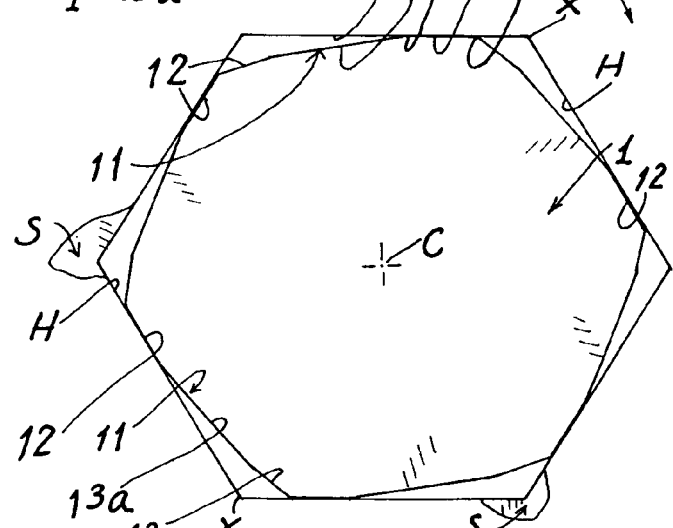
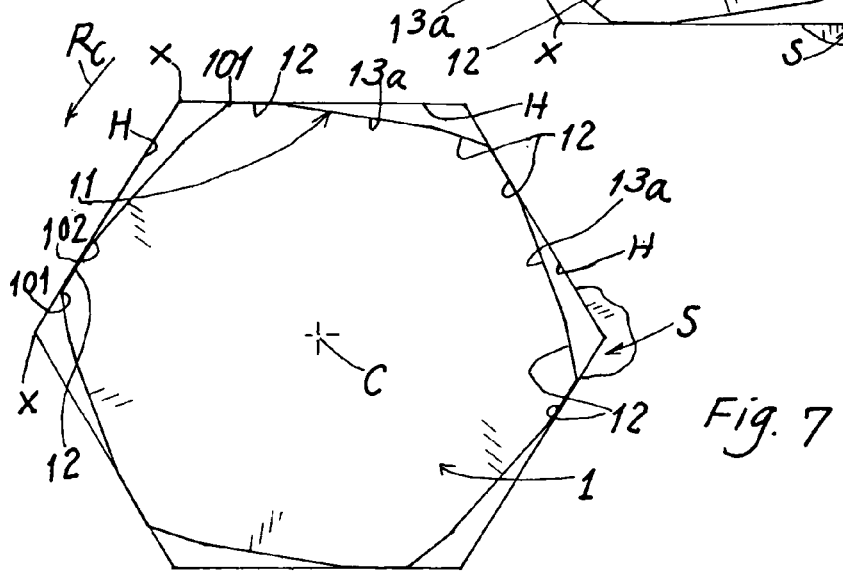

ANTI-WEARING NUT AND BOLT

BACKGROUND OF THE INVENTION

A conventional polygonal nut or bolt, such as a hexagonal nut N as shown in FIG. 1, is rotatably driven by a socket S having polygonal or hexagonal sides H when tightened or loosened. The apex or corner line L of each apex of polygonal nut N will be linearly bitten or dogged by the polygonal side H of the socket S. After repeated uses, the corners of the nut or bolt will be worn or damaged to cause loosening or slipping of the nut or bolt in the socket to thereby influence a tightening or loosening operation of the nut or bolt.

Meanwhile, the nut or bolt, when worn, will be oxidized by the environment to be rusty or corroded. Such a conventional nut or bolt will be damaged or presented with poor appearance.

The present inventor has found the drawbacks of the conventional polygonal nut and bolt, and invented the present anti-wearing nut and bolt.

SUMMARY OF THE INVENTION

The object of the present invention is to provide an anti-wearing nut or bolt having a head portion adapted to be engaged with a polygonal socket, including: a plurality of polygonal sides circumferentially formed on the head portion of the nut or bolt and; each polygonal side including: two inclined sub-sides (or inclined partial sides) respectively inclined outwardly convergently from opposite apexes of each polygonal side, each inclined sub-side extrapolatively defining a small biasing acute angle between each inclined sub-side and a corresponding socket side juxtapositioned to each polygonal side of the nut or bolt, and an intermediate sub-side transversely intersecting the two inclined sub-sides; whereby upon a clockwise or counter-clockwise rotation of the socket, one inclined sub-side of the nut or bolt will be planarly engaged with each socket side, without being linearly bitten or dogged, to thereby prevent wearing or damage of the apexes of the nut or bolt, and also to prevent slipping of the nut or bolt within the socket when rotated.

BRIEF DESCRIPTION OF THE DRAWINGS

FIG. 5 is a cross sectional drawing of a head portion of a hexagonal nut or bolt of another preferred embodiment of the present invention within a hexagonal socket.

FIG. 6 is an illustration of the present invention when rotating the socket clockwise (R) from FIG. 5.

FIG. 7 is a cross sectional drawing of the present invention when rotating the socket counter-clockwise (Rc) from FIG. 5.

DETAILED DESCRIPTION

Figure 1:
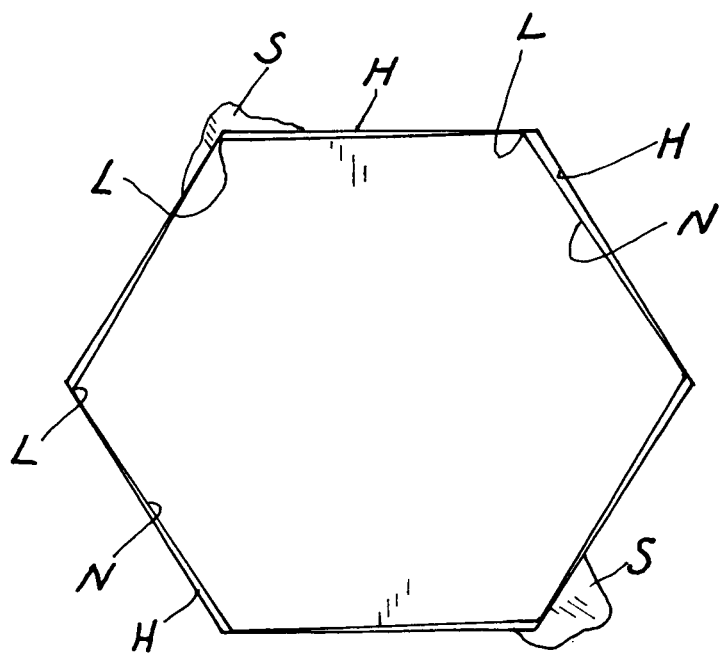
FIG. 1 is a cross sectional illustration of a conventional hexagonal nut or bolt head engaged in a hexagonal socket.
Figure 2:
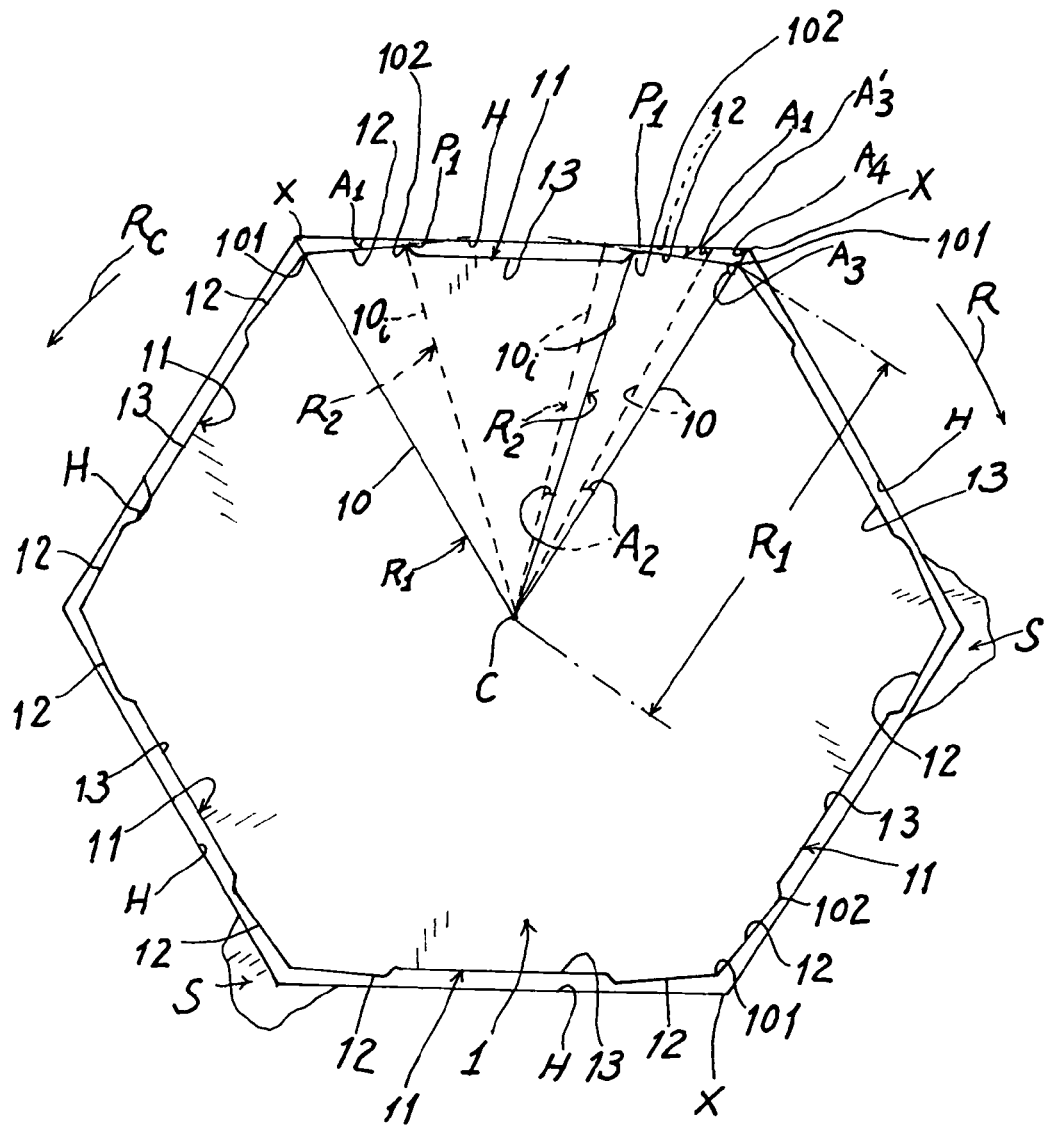
FIG. 2 is a cross sectional illustration of a head portion of a hexagonal nut or bolt of the present invention within a hexagonal socket.
Figure 3:
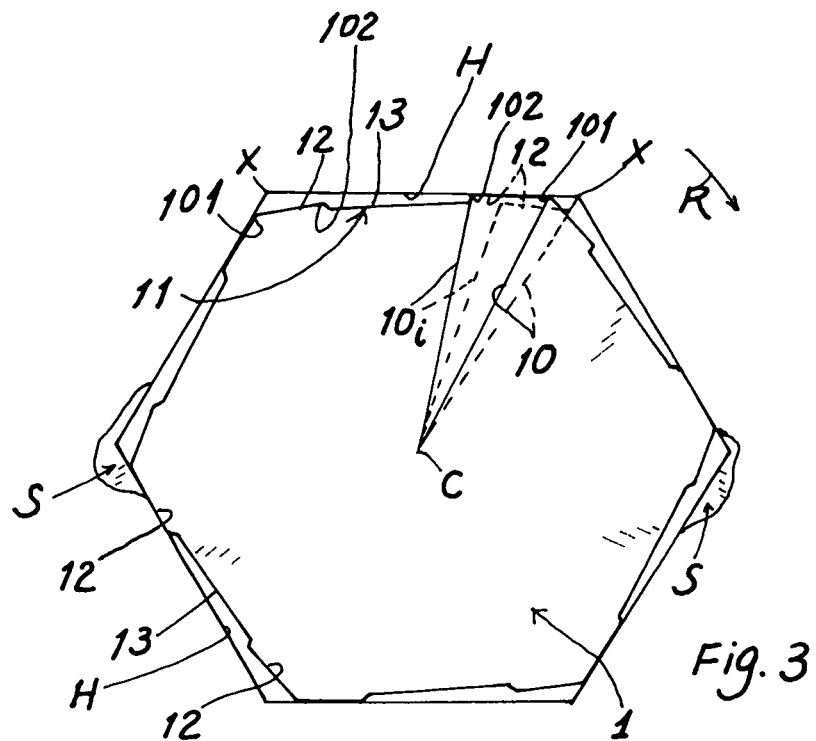
FIG. 3 is an illustration of the present invention when rotating the socket clockwise (R) from FIG. 2.
Figure 4:
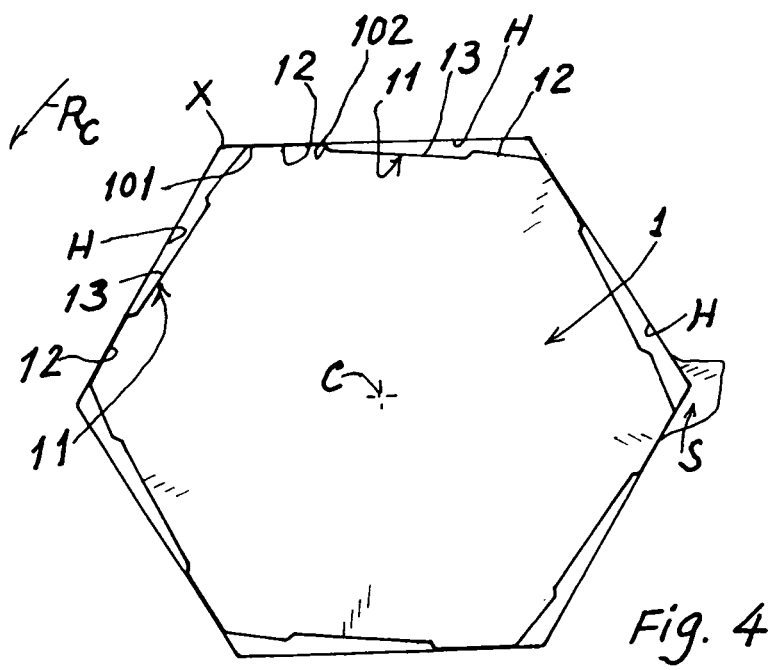
FIG. 4 is an illustration of the present invention when rotating the socket counter-clockwise (Rc) from FIG. 2.

As shown in FIGS. 2-4, the polygonal nut or bolt 1, adapted to be engaged with a polygonal socket S, comprises a plurality of polygonal sides 11 (such as hexagonal sides) circumferentially formed on a head portion of the polygonal nut or bolt 1; each polygonal side 11 including: two inclined sub-sides (or inclined partial sides) 12 respectively inclined outwardly convergently from opposite apexes 101 of each polygonal side 11 and each inclined sub-side 12 extrapolatively defining a small biasing acute angle A1 between each inclined sub-side 12 and a corresponding socket side H of the socket S having each socket side H juxtapositioned to each polygonal side 11 of the nut or bolt 1; and an intermediate sub-side (or intermediate partial side) 13 transversely intersected with the two inclined sub-sides 12 at two inscribed corners 102 each corner 102 formed on an outer end of each inclined sub-side 12 and separating from each corresponding socket side H with an aperture P1 (FIG. 2).

Each intermediate sub-side 13 may be a recess as radially recessed inwardly as shown in FIGS. 2~4. Or, the intermediate sub-side may be a linear or flat sub-side 13a as shown in FIGS. 5~7 to be linearly intersected or connected with the two inscribed corners 102.

Other modifications may be made for the diversified shapes or forms for the intermediate sub-sides 13, 13a, not limited in the present invention.

Each inclined sub-side 12 may be formed as planar or linear (when viewed from its cross section), or may be formed as a convexly curved or a concavely curved face, not limited in the present invention.

The small biasing acute angle A1 may have a range between 2 degrees through 30 degrees, preferably ranging from 2~8 degrees, but not limited in the present invention.

The nut or bolt 1 may be polygonal, including hexagonal, octagonal, pentagonal, and any other angular shapes. They may be used as vehicle nut or bolt, or any other industrial fields.

Each inclined sub-side 12 is intersected or connected between an apex 101 of the polygonal nut or bolt 1, and an inscribed corner 102; and each inclined sub-side 12 inclined outwardly from each apex 101 towards a middle section or portion of each socket side H to extrapolatively define the small biasing acute angle A1 between the inclined sub-side 12 and the corresponding socket side H juxtapositioned to the polygonal side 11 especially as shown in FIG. 2.

The inclined sub-side 12 is also transversely confined in between an outer end of a circumscribed side 10 and an outer end of an inscribed side 10i of a "triangle" among points 101, 102 and C (a common center) as shown in FIG. 2, in which the circumscribed side 10 is defined between an apex 101 of the nut (or bolt) 1 and the common center C of the nut (or bolt) 1 and of the socket S, and the inscribed side 10i is defined between an inscribed corner 102 and the common center C.

When a socket corner X, an apex 101 of the nut (or bolt), and the center C are linearly aligned, the circumscribed side 10 is equivalent to a circumscribed radius R1 between the apex 101 and the common center C, and the inscribed side 10i is equivalent to an inscribed radius R2 between the inscribed corner 102 and the common center C.

Upon a clockwise rotation R of the socket S, the circumscribed side 10 is relatively rotated counter-clockwise (with the circumscribed radius R1) about the center C in a rotating angle A2 towards the socket side H; while the inscribed side 10i is relatively rotated counter-clockwise (with the inscribed radius R2) about the center C in the rotating angle A2 towards the socket side H, thereby coinciding the inclined sub-side 12 with the socket side H as shown in FIG. 2 as moving from the solid lines to the dotted lines. Namely, the inclined sub-side 12 of the nut (or bolt) is rotated in the small biasing acute angle A1 to be finally coincided with the socket side H of the socket S.

By the way, the inclined sub-side 12 is coincided or aligned with the socket side H from FIG. 2 to FIG. 3, and upon the rotation of the socket S clockwise (R), the nut (or bolt) 1 will be stably rotatably driven for fastening the nut (or bolt). Since the inclined sub-side 12 has been planarly coincided or engaged with the socket side H in a planar contact (rather than a linear frictional contact as effected by the conventional nut or bolt), the polygonal sides or faces 11 of the nut or bolt 1 will not be worn or damaged, thereby preventing slipping of the nut (or bolt) within the socket S and preventing the frictional wearing between the nut (or bolt) and the socket.

Comparatively, by rotating the socket S counter-clockwise (Rc) from FIG. 2 to FIG. 4, the nut or bolt will be loosened or unfastened by the socket.

Similarly, by rotating the socket from FIG. 5 to FIG. 6, the nut or bolt will be tightened. While rotating the socket from FIG. 5 to FIG. 7, the nut or bolt will then be unfastened.

So, the nut or bolt of the present invention will be reliably safely operated and also be well protected for enhancing its service life when used.

It is interesting to find out a relationship between the biasing acute angle A1 and the rotating angel A2 by the following approach or analysis:

Comparing the triangle of solid lines comprised of the circumscribed side 10, the inscribed side 10$i$ and the inclined sub-side 12 among points 101, 102 and C as shown in FIG. 2 with the triangle of dotted lines comprised of the "dotted-line" circumscribed side 10, the "dotted-line" inscribed side 10$i$ and the sub-side 12 after being rotated in a rotating angle A2.

An inner angle A3 is equal to the biasing acute angle A1 plus an outer angle A4 confined between a radial side (between socket corner X and center C) and a partial socket side H as indicated by following formula:

$$A3 = A1 + A4$$

Another inner angle A'3 is equal to the rotating angle A2 plus the outer angle A4 in view of the triangle among radial side (between X and C), the "dotted-line" side 10 and a partial socket side H by following formula:

$$A'3 = A2 + A4$$

Since the solid-line triangle of solid-line side 10, solid-line side 10$i$, and the inclined sub-side 12 may be superimposedly equal to the dotted-line triangle of dotted-line side 10, dotted-line side 10$i$; and the inclined sub-side 12, the inner angle A3 should be equal to another inner angle A'3 with following formula:

$$A3 = A'3;$$

So, $A1 + A4 = A2 + A4$

Therefore, A1 is equal to A2, indicating that the biasing acute angle A1 is equal to the rotating angle A2.

By the way, in order to design a biasing acute angle A1 for coinciding the inclined sub-side 12 with the socket side H for a stable planar contact between the nut (or bolt) side 11 and the socket side H when rotating the socket in a rotating angle A2, the biasing acute angle A1 should be equal to such a rotating angle A2. Namely, the less biasing acute angle A1 is, the less the rotating angle A2 will be. For a quick planar coincidence between the nut (or bolt) and the socket, the biasing acute angle A1 may thus be designed as small as possible, thereby enhancing a quicker and efficient reliable fastening or loosening operation of a nut or bolt by a socket.

Accordingly, the present invention may provide a nut or bolt which may be fastened or unfastened in a safer and more efficient way by preventing the slipping of the nut or bolt from the socket, and also for prolonging the service life by preventing wearing of the nut or bolt in the socket.

Meanwhile, the socket will also be protected as effected by the present invention.

The so-called "sub-side" 12 as aforementioned is logically designated in the present invention because such a "sub-side" is subordinate to or sub-divided from each polygonal side 11 of the nut or bolt. For a hexagonal nut or bolt, each side 11 contains 3 "faces" including two inclined sub-sides 12 and an intermediate sub-side 13 so that there are total 18 "faces" (sub-sides) of the hexagonal nut or bolt each having six sides.

The present invention may be modified without departing from the spirit and scope of the present invention.

We claim:

1. A polygonal nut or bolt, adapted to be engaged with a polygonal socket, comprising a plurality of polygonal sides circumferentially formed on a head portion of the polygonal nut or bolt; at least one said polygonal side of said nut or bolt including: two inclined sub-sides respectively inclined outwardly convergently from opposite apexes of said polygonal side, and each said inclined sub-side extrapolatively defining a small biasing acute angle between each said inclined sub-side and a corresponding socket side of the socket having said socket side juxtapositioned to said polygonal side of the nut or bolt; and an intermediate sub-side transversely intersected with the two inclined sub-sides at two inscribed corners each said inscribed corner formed on an outer end of each said inclined sub-side and separating from each corresponding socket side of the socket with an aperture, whereby upon a rotation of said socket, one said inclined sub-side of said nut or bolt will be planarly coincided with one said socket side of said socket for fastening or unfastening said nut or bolt by said socket.

2. A polygonal nut or bolt according to claim 1, wherein each said intermediate sub-side includes a recess radially recessed inwardly.

3. A polygonal nut or bolt according to claim 1, wherein each said intermediate sub-side is a flat sub-side as linearly connected between the two inscribed corners, each said inscribed corner formed on an outer end of each said inclined sub-side.

4. A polygonal nut or bolt according to claim 1, wherein each said inclined sub-side is formed as a planar face.

5. A polygonal nut or bolt according to claim 1, wherein each said inclined sub-side is formed as a curved face.

6. A polygonal nut or bolt according to claim 1, wherein said small biasing acute angle ranges between 2 degrees through 30 degrees.

7. A polygonal nut or bolt according to claim 1, wherein each said inclined sub-side is intersected or connected between an apex of the polygonal nut or bolt, and an inscribed corner; and each said inclined sub-side inclined outwardly from one said apex towards a middle portion of one corresponding socket side of said socket juxtapositioned to the polygonal side of said nut or bolt to extrapolatively define the small biasing acute angle between the inclined sub-side and the corresponding socket side of said socket.

8. A polygonal nut or bolt according to claim 1, wherein each said inclined sub-side is transversely confined in between an outer end of one circumscribed side and an outer end of one inscribed side of a triangle among one said apex, one said inscribed corner, and a common center of the nut and the socket, in which the circumscribed side is defined between said apex of the nut or bolt and the common center, and the inscribed side defined between the inscribed corner and the common center; whereby upon a rotation of the socket, the circumscribed side is relatively rotated about the common center in a rotating angle towards the socket side of the socket, and the inscribed side is relatively rotated about the common center in said rotating angle towards the socket side, thereby coinciding the inclined sub-side with the socket side.

* * * * *